(12) United States Patent
Tran et al.

(10) Patent No.: US 7,111,299 B2
(45) Date of Patent: Sep. 19, 2006

(54) METHOD AND DEVICE TO ASSIST IN THE EXECUTION OF TASKS OF PARALLEL JOBS

(75) Inventors: Quoc-Luan Allen Tran, Toronto (CA); Ming Xu, Toronto (CA)

(73) Assignee: Platform Computing Corporation, Toronto (CA)

( * ) Notice: Subject to any disclaimer, the term of this patent is extended or adjusted under 35 U.S.C. 154(b) by 552 days.

(21) Appl. No.: 10/025,811

(22) Filed: Dec. 26, 2001

(65) Prior Publication Data
US 2003/0120704 A1 Jun. 26, 2003

(51) Int. Cl.
*G06F 9/46* (2006.01)

(52) U.S. Cl. .................. 718/104; 718/106; 718/107

(58) Field of Classification Search ........ 718/100–104, 718/106, 107
See application file for complete search history.

(56) References Cited

U.S. PATENT DOCUMENTS

| | | | | |
|---|---|---|---|---|
| 5,594,901 A | * | 1/1997 | Andoh | 718/104 |
| 5,752,030 A | * | 5/1998 | Konno et al. | 718/102 |
| 6,405,234 B1 | * | 6/2002 | Ventrone | 718/102 |
| 6,636,884 B1 | * | 10/2003 | Iida et al. | 718/104 |
| 2002/0156932 A1 | * | 10/2002 | Schneiderman | 719/317 |
| 2003/0120708 A1 | * | 6/2003 | Pulsipher et al. | 709/106 |

\* cited by examiner

*Primary Examiner*—William Thomson
*Assistant Examiner*—Van Nguyen

(57) ABSTRACT

Parallel jobs comprise multiple tasks that can be executed in parallel by separate resources to produce an exit status for each task. The resource manager receives the jobs and dispatches the parallel tasks of the job together with task starters to a job launcher unit. The job launcher unit starts the task starters on the selected resources. Each task starter is associated with a task and commences execution of the task on the selected resource. At commencement of a task, the task starter sends the host and process identifier to the resource manager. At completion of the task, the task starters collect the exit status of the task from the associated resource and send the exit status of the task back to the resource manager. An external event unit associated with the resource manager receives the process identifier and exit status of the tasks from the task starter.

15 Claims, 5 Drawing Sheets

Figure 2 – Prior Art

METHOD AND DEVICE TO ASSIST IN THE EXECUTION OF TASKS OF PARALLEL JOBS

FIELD OF THE INVENTION

The present invention relates generally to devices and methods for executing parallel jobs that generally consist of multiple tasks being executed by different resources in parallel. More particularly, the present invention relates to a device and method to facilitate execution of the parallel jobs.

BACKGROUND OF THE INVENTION

Parallel processing has been used in the past to execute parallel jobs quickly and efficiently. In parallel processing systems, the multiple tasks of a parallel job are separated and allocated to more than one resource, generally located on more than one host for parallel execution. The exit statuses of the completed tasks together constitute the completed job.

FIG. 1 illustrates a prior art parallel processing system, shown generally by reference numeral 10. As shown in FIG. 1, the prior art system 10 comprises a vendor parallel job launcher 8 that allocates and dispatches message passing interface (MPI) tasks 4 to resources 6. The vendor parallel job launcher 8 may also support secondary features, such as providing support for a switch to facilitate high-speed communication between resources. The resources 6 would then complete the MPI tasks 4 and generally send the exit status of the MPI tasks 4 to an appropriate location, which may be dictated by the framework, and/or programmed by the system. The resources 6 are generally present on more than one host 40 and a particular host 40 may have more than one resource. The resources 6 can include processors, memory, swap space or even a license for software.

The prior art system 10 shown in FIG. 1 was found to suffer from the disadvantage that there was no job management present. The lack of a job management function resulted in inefficient allocation of resources to jobs, an inability to monitor resources used by the job and inability to control the jobs.

Accordingly, a further improvement on the prior art system 10 illustrated in FIG. 1 was developed and is shown generally by reference numeral 20 in FIG. 2. As shown in FIG. 2, the improved prior art system 20 comprises a resource and parallel application manager (PAM), shown generally by reference numeral 24. The PAM 24 controls and manages the parallel jobs and offers comprehensive collection and management of the parallel jobs. In general, the PAM 24 collects the resources 6 required to execute each task 4 of a parallel job, whether the job is parallel or sequential, or a combination of both. In this way, the PAM 24 provides a point for job control. In one embodiment, the PAM 24 controls the execution of the parallel job, such as by performing the functions of stop, resume and suspension of a parallel job, or the tasks of a parallel job.

While the system 20 shown in FIG. 2 provides improved resource management, the system 20 suffers from the disadvantage that in order to permit the PAM 24 to communicate with the vendor parallel job launcher 18, substantial revisions and customization are required to the different components. This is the case, in part, because the PAM 24 is generally generic but the vendor parallel job launcher 18 is vendor-specific. Therefore, customized software and code is generally required for the PAM 24 to communicate with the job launcher 18, or users must utilize specific vendor parallel job launcher 18 supplied by the same vendors as the PAM 24.

If the PAM 24 and the job launcher 18 cannot communicate, some features or abilities may be sacrificed. For example, the PAM 24 needs information regarding the tasks 4 in order to (a) collect resources for the job, and (b) control the job. In order to access task 4, such as to monitor usage or control execution of the task, the PAM 24 generally requires the host and process identifier (host/pid) of a task 4. However, because in the prior art system 20 the parallel job launcher 18 commenced the task 4 on the resource 6, the job launcher 18 would generally have the process identifier of the task 4. Therefore, generally it was necessary to customize the PAM 24 and the job launcher 18 so that the host and process identifier host/pid could be communicated from the job launcher 18 to the PAM 24.

Furthermore, some resources 6 may also be vendor specific. In this case, customized software may be required to communicate between the resource 6, the job launcher 18 and PAM 24.

Accordingly, in order to launch and execute tasks 4 of parallel jobs, it has been necessary to customize the PAM 24, the job launcher 18, and sometimes applications being executed on the resource 6 so that the various components could communicate. This has been cumbersome for several reasons. Firstly, it has been difficult and time consuming to prepare the customized portions for the PAM 24 and job launcher 18. In addition, this customization would need to be done for each PAM 24 and job launcher 18 combination. Furthermore, this customization generally must be updated each time either the PAM 24 or the job launcher 18 is updated. In the case where the resource 6 comprises a vendor-specific application, the customization may need to be updated each time a new version of the application is installed.

Secondly, in order to create this customized portion, it is generally necessary to have information regarding the PAM 24, the job launcher 18 and any vendor-specific application being executed by the resource 6. While the PAM 24 is often generic, the job launcher 18 is generally vendor-specific and the applications being executed by the resource 6 is usually vendor-specific and occasionally have specific requirements, not available to the public. In other words, some applications and job launchers 18 are generally purchased from different vendors and can be "closed applications", meaning that it is not easy, or even possible, to see how they operate. In order to create the customized portion for "closed applications", an analysis must be made of the external functioning of the closed applications so that the customization can be completed. This is often a time consuming and difficult process and sometimes may not even be possible. Alternately, if the vendor of the job launcher 18 is co-operating, the internal details of the generally "closed" parallel job launcher 18 may be obtained.

A further disadvantage of the prior art devices is that the PAM 24 lacks information about the completion of the tasks 4. In other words, while the PAM 24 manages the resources 6 and controls the execution of jobs, the ability of the PAM 24 to do these functions is limited because the prior art PAM 24 devices do not generally have easy access to the exits status of the tasks 4. As illustrated in FIGS. 1 and 2 the prior art systems 10, 20 provide little or no information back to the PAM 24 regarding the tasks 4. The PAM 24 in the prior art systems 10, 20 have little or no information about the MPI tasks after they are dispatched to the parallel job launcher 18.

Accordingly, the prior art suffers from several disadvantages. Principally among these is that the various components, such as the PAM 24 and the vendor parallel job launcher 18, cannot communicate with one another unless detailed customized software is prepared for each of them, or, the same vendor supplies them. The prior art also suffers from the disadvantage that the PAM 24 cannot easily access, or communicate with the tasks 4, which limits the ability of the PAM 24 to comprehensively manage the resources 6 and control the execution of parallel jobs. Furthermore, the prior art devices suffer from the disadvantage that the PAM 24 lacks easy access to information regarding the exit status of tasks 4, and, in particular the resource usage of the task 4.

SUMMARY OF THE INVENTION

Accordingly, it is an object of this invention to at least partially overcome some of the disadvantages of the prior art. In particular, the present invention provides a device and method to facilitate interconnection of various components in a parallel job execution environment having generic components and vendor-specific components.

Accordingly, in one of its aspects, this invention resides in a system for executing parallel jobs, each parallel job comprising multiple tasks executable in parallel by separate resources said system comprising a resource manager for receiving the jobs and dispatching the parallel tasks of the job to the resources through a job launcher unit, a device to facilitate execution of the tasks of a parallel job comprising a task starter associated with each task, each task starter commencing execution, on the associated resource, of the task sent, collecting a process identifier of the task from the associated resource, and sending the process identifier of the task to the resource manager; an external event unit, associated with the resource manager, for receiving the process identifier of the tasks from the task starters In a further aspect, the present invention provides a system for executing parallel jobs, each parallel job comprising multiple tasks executable in parallel by separate resources to produce an exit status for the task, said system comprising a resource manager for receiving the jobs and dispatching the tasks to the resources, a method for facilitating execution of the multiple tasks of a parallel job comprising for each task dispatching the task together with an associated task starter from the resource manager to task starters associated with each resource for execution of the task; for each task starter, collecting a process identifier of the task being executed from the resources; and for each task starter, sending the process identifier to an external event unit associated with the resource manager.

In a still further aspect, the present invention provides a system for executing parallel jobs, each parallel job comprising multiple tasks being executed in parallel by separate resources to produce an exit status for the task, said system comprising a resource manager for receiving the jobs and selecting resources to execute the multiple tasks of the job; a task starter associated with each task, each task starter commencing, on an associated resource, the tasks sent from the resource manager, collecting a process identifier from the associated resource, and sending the process identifier of the task to the resource manager.

One advantage of the present invention is that a framework is provided to connect parallel job launchers, which are generally vendor-specific, to other components in a parallel execution system, such as the PAM and the task starters, without requiring substantial customized portions, such as customized software and code changes. This is accomplished in part by the PAM generating command instructions identifying the host containing resources to execute the task and having task starters start the tasks on the associated resource. The task starter can then return information regarding the task 4, such as the host and process identifier, to the PAM. This assists a user to combine various PAMs, parallel job launchers and resources, without requiring substantial customized software and code changes to satisfy vendor-specific integrations.

A further advantage of the present invention is that the PAM now receives information about each task such as the process identifier and the host executing the task. This permits PAM to more efficiently perform job control on the tasks and manage the resources. This may include performing proxy processes or using daemons located on the host that started the task. This may also include having daemons located on the hosts give periodic information regarding resource usage of the task.

A further advantage of the present invention is that, because the integration is performed without requiring substantial vendor-specific integrations or customized code changes, changes in the vendor-specific applications being executed on the resources do not affect the operation of the other components in the system. For instance, if there is an update in the vendor parallel job launcher or in the application of one of the resources, the changes will generally be accommodated for. In this way, little to no revisions are required each time an update or change is made to the vendor-specific components of the system.

A still further advantage of the present invention is that the task starters for starting the tasks on the resources do not require detailed information of the applications being executed by the resources. Rather, the general information, such as the process identifier and the host, are collected by the task starters at the start of the tasks and sent to the PAM. Likewise, the task starters collect the exit status of the task and send this back to the PAM. In this way, the PAM can treat the task starters on a generic level thereby avoiding problems associated with closed job launchers and closed applications which do not provide, or do not easily provide, information required to create the customized software and code changes in the prior art systems. The task starters may also collect the resource usage of the task 4. This can provide more specific information regarding the task 4, such as resource usage, to the PAM for other purposes, such as accounting and billing or improving efficiency.

BRIEF DESCRIPTION OF THE DRAWINGS

In the drawings, which illustrate embodiments of the invention.

DETAILED DESCRIPTION OF THE PREFERRED EMBODIMENTS

A preferred embodiment of the present invention and its advantages can be understood by referring to the present drawings. In the present drawings, like numerals are used for like and corresponding parts of the accompanying drawings.

Figure 1:
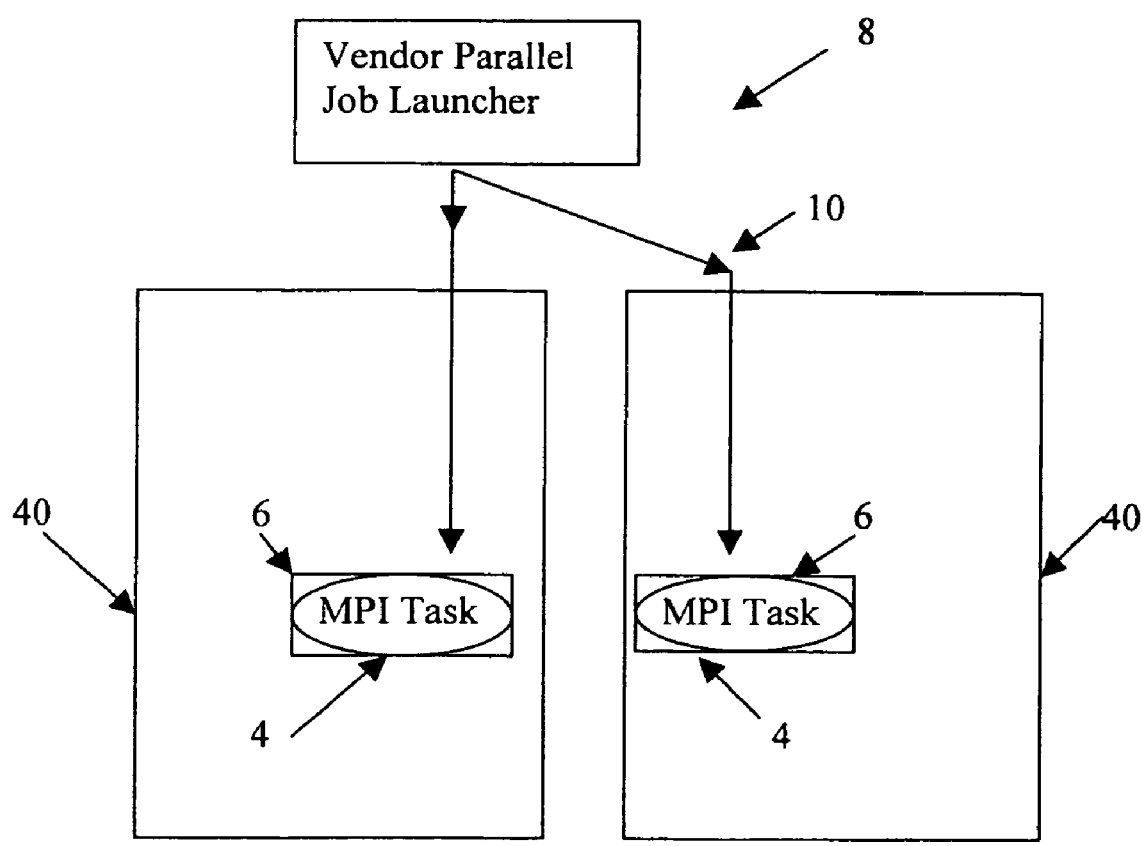
FIG. 1 is a schematic drawing showing a prior art parallel job execution system having no job management.
Figure 2:
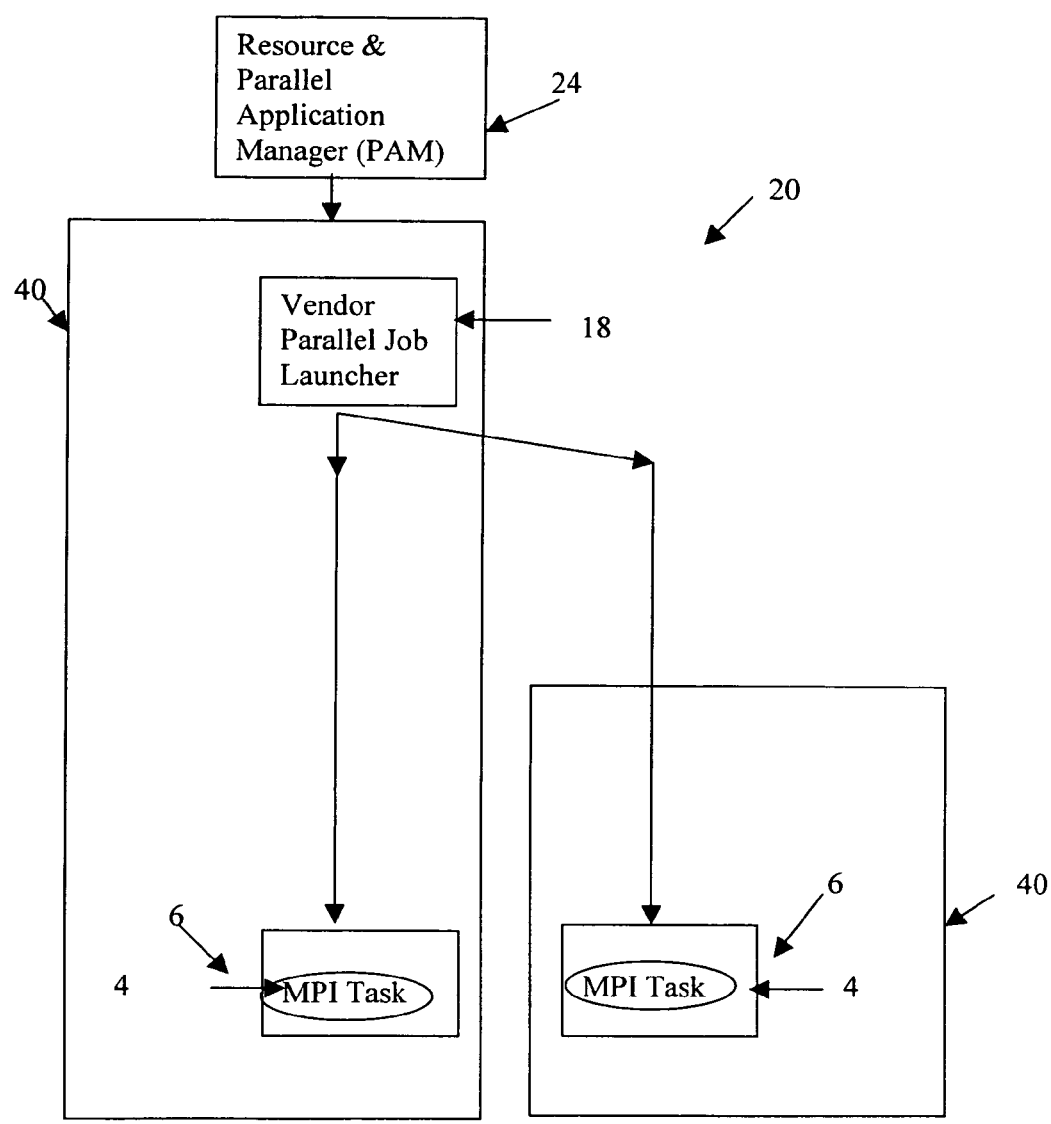
FIG. 2 is a schematic drawing showing a prior art parallel job execution system having a resource and parallel application manager.
Figure 3:
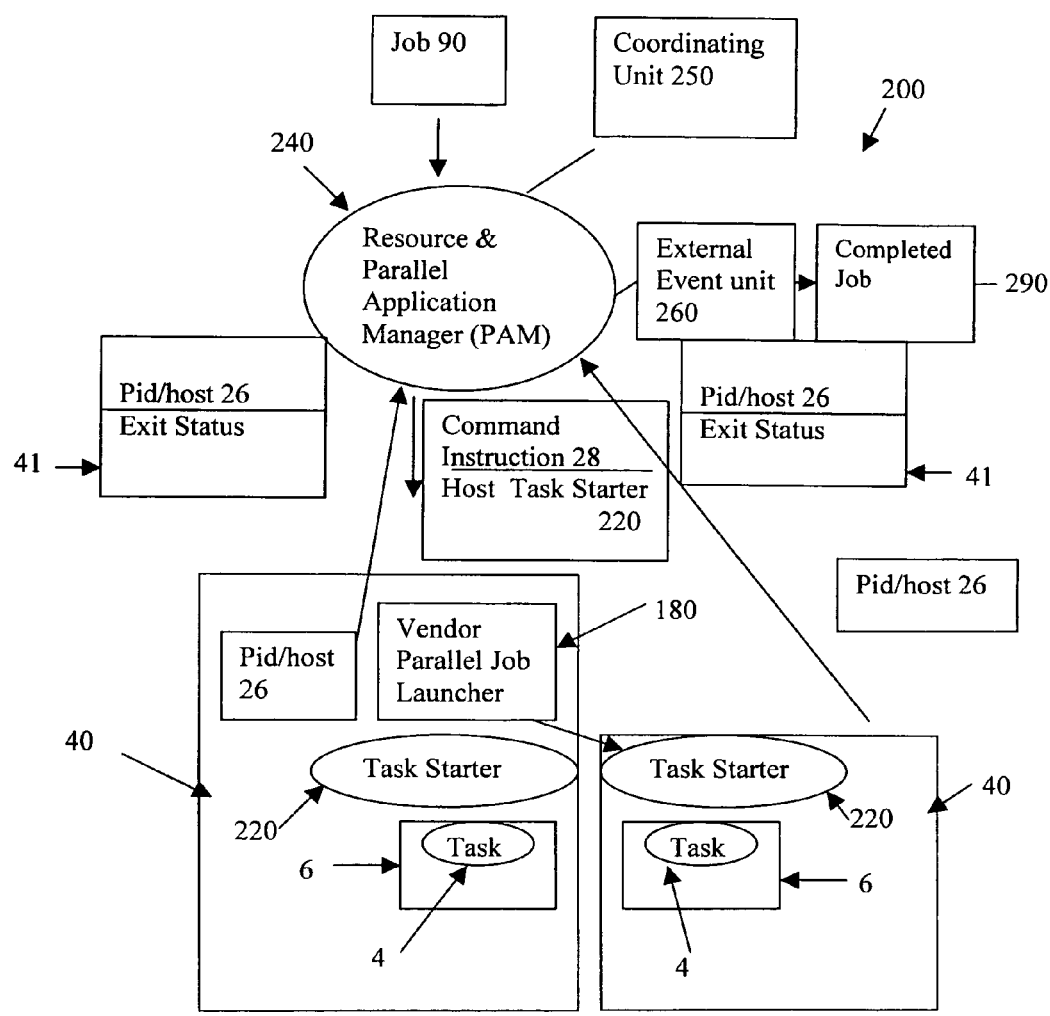
FIG. 3 is a schematic drawing of a system according to one embodiment of the present invention.

FIG. 3 illustrates a system, shown generally by reference numeral 200, according to one embodiment of the present invention. As illustrated in FIG. 3, the system 200 comprises a resource and parallel application manager (PAM) 240, a vendor parallel job launcher 180 and task starters 220 associated with each task 4 executing on each resource 6.

The PAM 240 receives parallel jobs 90 and separates the parallel jobs 90 into multiple tasks 4. At this point, the PAM 240 will make a selection of the resources 6 to execute the tasks 4. This selection will likely be made to increase efficiency as is known in the art. The PAM 240 then dispatches the tasks 4 through the vendor parallel job launcher 180 with the task starters 220 to the selected resource 6. The tasks 4 are executable in parallel by the separate resources 6, to produce an exit status 41 for each task 4.

Upon starting a task 4 on a resource 6, a process identifier "pid" will be generated for the task 4. The process identifier "pid" will generally be generated by the resource 6, the operating system and/or the task 4. In starting the task 4 on the resource 6, the task starter 220 can obtain the process identifier "pid" for the task 4. In addition, when the task 4 exits, the task starter 220 will have the exit status 41, and preferably resource usage, of the task 4. This information can be published by the task starter 220 to any processing element, including the PAM 240.

The system 200 preferably also comprises a coordinating unit 250 and an external event unit 260 associated with the PAM 240. The coordinating unit 250 and external event unit 260 may form a part of the PAM 240, or, may be a plug in or add on unit.

Prior to the PAM dispatching a task 4, the PAM 240, or the coordinating unit 250 associated with the PAM 240, can generate a command instruction 28 for each task 4. When the task starters 220 return the process identifier pid or the exit status 41 of the task 4 to the PAM 240, the external event unit 260 of the PAM 240 generally receives this information. The PAM 240 then stores this information and provides the completed job 290 to a memory location, another unit, an input/output device (not shown), or another device as specified by the user.

Figure 4:
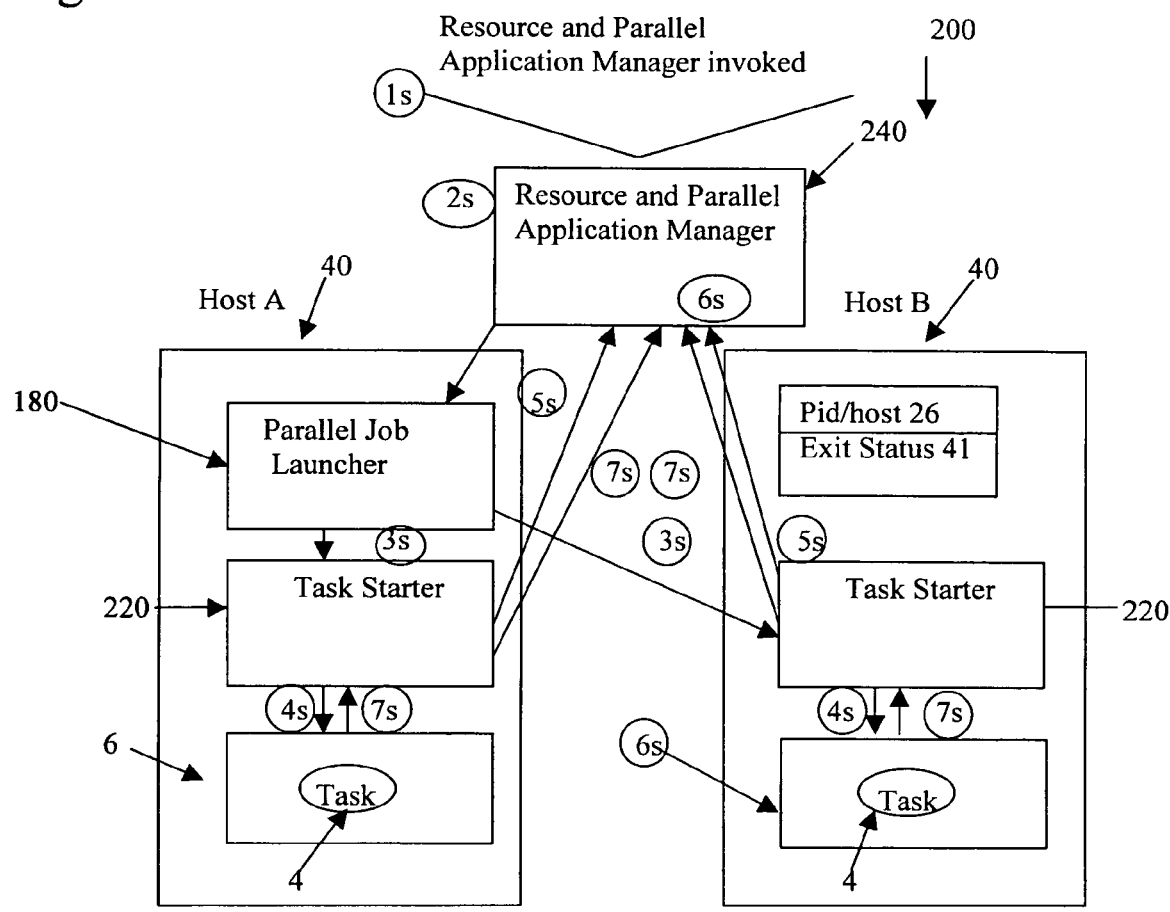
FIG. 4 is an illustration of a system according to one embodiment of the present invention showing the various steps which are performed during execution.
Figure 5:
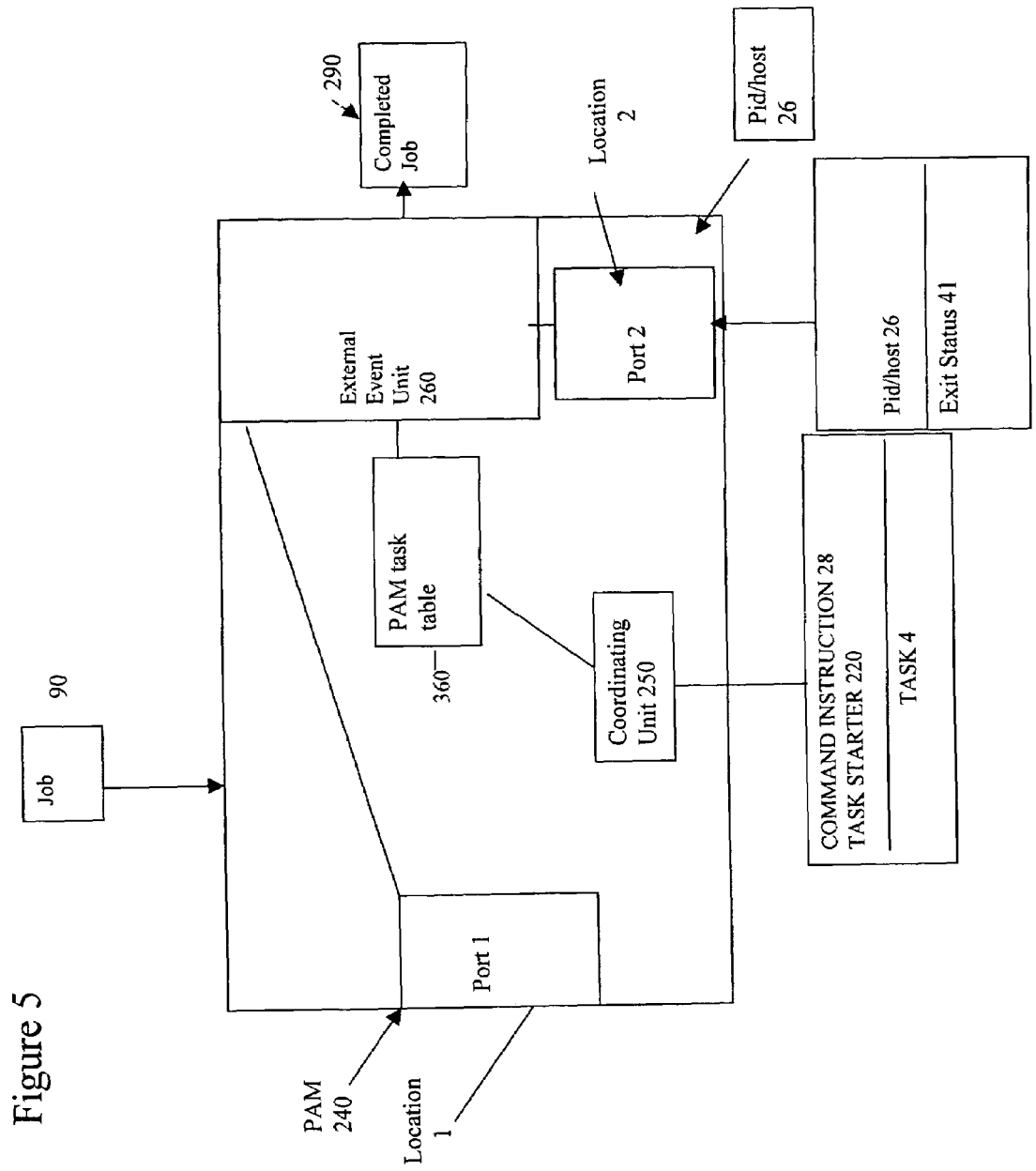
FIG. 5 is a schematic representation of a resource and parallel application manager according to one embodiment of the present invention.

The command instructions 28 generated by the PAM 240 generally comprise a host identifier shown generally as "host", in FIGS. 3 and 4. The host identifier "host" identifies the host 40 containing the resource 6 to execute the task 4. In the case where the host 40 contains more than one resource 6, the host identifier "host" will also identify the resource 6 to execute the task 4. In addition, when the task starter 220 sends information, such as the process identifier pid or the exit status 41 of a task 4 to the PAM 240, the task starter 220 will also return a portion of the command information 28, such as the host identifier host, to assist the PAM 240 in correlating the information being sent by the task starter 220 with the information regarding the task 4 preferably stored in the PAM 240. Accordingly, when the task 4 commences on the resource 6, the task starter 220 will send, preferably, the process identifier and host identifier, shown generally by symbol "pid/host" and reference numeral 26 in FIGS. 3, 4 and 5. In this preferred embodiment, at least the host identifier host of the command instructions 28 will be stored by the PAM 240 to assist in correlating the information being sent by the task starter 220. The host identifier "host" in the pid/host information 26 could be copied from the command instruction, or, may be generated by the resource 6, the operating system or the task 4, similar to the process identifier pid.

Each command instruction 28 will correspond to a task 4 and the command instruction 28, or a portion thereof, will be stored by the coordinating unit 250 in the PAM 240, such as in the task table 360. At the same time, in a preferred embodiment, the coordinating unit 250 may store actions to be performed by the external event unit 260 at the occurrence of external events. When the coordinating unit 250 stores the actions, the coordinating unit 250 generally associates the action with at least a portion of the command instruction 28 for the task 4. The actions may be stored in the task table 360 shown in FIG. 5 and can comprise instructions, handlers or other types of actions, which are to be executed upon occurrence of an external event.

In a preferred embodiment, such external events may include receipt of the exit status 41 of the task 4 by the external event unit 260, and, receipt of the process identifier and host identifier pid/host information 26 from the task starters 220. The actions that the external event unit 260 executes can be predetermined. In a preferred embodiment, the coordinating unit 250 can pre-program the type of actions which the external event unit 260 will take, based on the host 40 and resource 6 selected to execute the task 4, as stored in the PAM 240, such as in the task table 360. In general, the external event unit 250 will likely perform a commencement action upon receipt of the pid/host information 26 from a task starter 220. This task commencement action may include simply storing the process identifier in the PAM 240 for the corresponding task 4. The host identifier of the pid/host information 26 can assist in correlating the process identifier pid with the other information corresponding to the task 4 previously stored in the PAM 240. The external event unit 260 may also perform a task exit action, which may occur upon receipt of the exit status 41 of the task 4, and/or the resource usage. Such an action may include using the pid/host information 26 to correlating the exit status 41 with the exit status 41 from other tasks 4 to assist in assembling the completed task. The task exit action may also include storing and/or summing the resource usage for the task 4, for accounting and billing purposes.

The command instruction 28 may also comprise location information. The location information can comprise the information where the exit status 41 should be sent. For instance, with reference to FIG. 5, the PAM 240 is shown as comprising two separate locations, namely Location 1 and Location 2 for receiving the exit status 41 from the task starters 220 upon completion of the task 4. Location 1 and Location 2 can be simply separate ports, such as PAMPORT 1 and PAMPORT 2, of a host 40 which can receive information such as the exit status 41 of the task 4.

It is understood the PAM 240 may have a number of ports on a host to receive the exit status 41 of the task 4 or other information from the task starters 220. It is also understood that the PAM 240 and resources 6 could be connected through a network, in which case the location information can comprise an address on the network for the PAM 240. In addition, if the network comprises the Internet, the location information could comprise an Internet Protocol (IP) address for the PAM 240.

For example, a command instruction 28 for the job launcher 180 may have the form of:

host A.1: TaskStarter PAMHOST:PAMPORT myjob <parameters>

This command instruction indicates that host A has been selected to execute the task 4. The symbol A.1 identifies a specific resource 6 in host A, in the event host A hosts more than one resource 6. The term "Task Starter" refers to the task starter 220 associated with the task 4. The term PAMHOST:PAMPORT indicates the location where information regarding the task 4 should be published in this case a specific port PAMPORT in the host PAMHOST which hosts the PAM 240. The following term "myjob <parameters>" are the parameters for executing the task 4.

It is understood that the command instruction 28 can be any type of instruction or data that can be associated with the task 4. In a preferred embodiment, the command instructions 28, or at least a portion thereof such as the host and/or resource identifier is returned with the process identifier pid. The command instructions 28 may also include other instructions for execution of the task 4. Preferably, the command instructions 28 include the task starter 220, shown as TaskStarter above, for commencing execution of the task 4 on an associated resource 6 selected by the PAM 240.

Accordingly, associated with each task 4 will be a command instruction 28 identifying the task 4, identifying the host 40 containing the resource 6 for executing the task 4, and identifying the location where information regarding the task 4, such as the process identifier pid and the exit status 41 of the task 4 should be published or sent, and containing the task starter 220. In other words, the command instructions 28, or a portion thereof, such as the host identifier host will preferably be returned with the process identifier to assist in mapping the process identifier pid with other information regarding the task 4 stored in the PAM 240.

In a preferred embodiment, the coordinating unit 250 inserts the information in the command instruction 28 identifying where the task starter 220 should return the pid/host information 26 as well as the exit status 41 and other information, such as resource usage. At the same time, the coordinating unit 250 will store in the PAM 240 the event handlers that the external event unit 260 should execute. In this way, the coordinating unit 250 coordinates the return of the information from the task starter 220, and, the specific actions that must be taken by the external event unit 260 upon receipt of this information. In a further preferred embodiment, the coordinating unit 250 can also modify or generate the command instructions 28 to cause the parallel job launcher 180 to start the task starter 220, instead of directly starting the task 4 on the resource 6. The coordinating unit 250 associated with the PAM 240 generally starts the job launcher unit 180 which then executes the command instructions 28 and starts the task starters 220. Accordingly, the coordinating unit 250 can modify or generate the command instructions 28 to assist in coordinating the task starter 220, the external event unit 260 and the job launcher 180.

The PAM 240, or the coordinating unit 250 generates the command instruction 28, for the parallel job launcher 180 and starts the parallel job launcher 180. The parallel job launcher 180 then starts the task starter 220 on the associated resource 6 selected by the PAM 240 for executing the task. In other words, the PAM 240 will have selected the host 40 which will execute the task 4 prior to the task 4 being dispatched from the PAM 240 to the parallel job launcher 180. The parallel job launcher 180 will then start the task starters 220 on to the host 40 and resource 6 identified by the command instructions 28. The task starters 220 will generally then start the task 4 on the resource 6.

The parallel job launcher 180 will have a process mechanism for starting the tasks 4 on the selected hosts 40 and resources 6. In one embodiment, this mechanism may incorporate a file or look-up table (not shown) that is read by the job launcher 180 which indicates where each of the resources 6 is located and how the job launcher 180 can dispatch and start the task 4 on the resource 6. It is understood that the parallel job launcher 180 may also perform secondary functions such as providing support for switches to facilitate high-speed communication between the hosts 40. It is also understood that the parallel job launcher 180 may be present or hosted on one of the hosts 40 which also contain a resource 6 as illustrated in FIGS. 3 and 4, or, the parallel job launcher 180 could be present or hosted on a separate host (not shown).

The parallel job launcher 180 starts the task starter 220 on one of the hosts 40. The task starter 220 will start the task 4 on the resource 6 of the host 40. As shown in FIGS. 3 and 4, there is a task starter 220 associated with each task 4 and starts the task 4 on the resource 6 sent from the PAM 240 through the parallel job launcher 180. The task starters 220 then commence the task 4 on the associated resource 6. At commencement of the task 4, the task starter 220 sends the host and process identifier pid/host 26 to the PAM 240. Once the resource 6 has completed the task 4 and obtained the exit status 41, the task starter 220 collects the exit status 41 of the task 4 from the associated resource 6, and in a preferred embodiment, the task starter 220 then sends the exit status 41 of the task 4 to the PAM 240 also. The command instructions 28 will include a location, such as PAMHOST/PAMPORT, to which the task starter 220 will send the exit status 41 of the task 4.

As stated above, the PAM 240 will generally have stored therein the command instructions 28, or a portion thereof such as the host to which the task 4 has been allocated, corresponding to each task 4. In a preferred embodiment, the task starter 220 will return the process identifier and host identifier, shown generally by symbol "pid/host" in reference numeral 26 in FIGS. 3, 4 and 5, to the PAM 240, once the task 4 is commenced. Generally, the pid/host 26 will be returned to the same location identified by the command instructions 28 for returning the exit status 41 of the task 4, such as PAMHOST/PAMPORT. The PAM 240 will then register that the task 4 has been commenced by the resource 6 on the host 40. This can generally be accomplished by the task commencement action, registering commencement of the task in the task table 360. At the same time, the process identifier pid will be recorded in the task table 360. The task 4 will be correlated with the process identifier pid by using at least a portion of the command instruction 28, such as the host identifier "host" in the pid/host 26, and, information regarding the host 40 and/or resource 6 to which the task 4 has been sent which has been stored in the PAM 240, likely in the task table 360.

By having the process identifier "pid" sent by the task starter 220 at the commencement of the task 4, the PAM 240 can more easily manage the resources 6 executing the task 4 by having confirmation that a task 4 has been received by the appropriate task starter 220, and, that the resource 6 is executing the task 4. Furthermore, by having the pid/host 26 for the task 4, the PAM 240 has the information necessary to directly control the tasks 4, such as to stop, resume or kill the task 4. The PAM 240 may also have daemons, or other functions, executing on the hosts 40 and sending information to the PAM 240 regarding resource usage of the task 4.

The PAM 240 also has information to collect the exit status of the task 4. In other words, once the task 4 is completed, the task starter 220 will return the exit status 41 of the task 4 to the PAM 240 along with the pid/host information 26. As the PAM 240 has already stored this information 26 for the task 4 in the task table 360, the exit status 41 can be more easily mapped in the task table 360. Furthermore, in addition to the exit status 41, the task starter 220 can also send the resource usage for the task 4 which is also mapped into the task table 360.

Should a delay occur from the time the resource manager 240 receives confirmation that a task 4 has been commenced oh an associated resource 6, the PAM 240 will be aware that the resource 6 is having difficulty executing tasks. The PAM 240 may then possibly, send a signal to another source such as the system administrator, advising of a potential problem with the resource 6. Likewise, if there is a delay from the time the PAM 240 dispatches a task 4, until the task starter 220 sends a confirmation that the task 4 has been received and execution has been commenced on the associated resource 6, the PAM 240 may send a signal indicating that another element in the system 200, such as the job launcher unit 180, may be encountering difficulties.

More routinely, the PAM 240 will monitor what resources 6 are executing tasks 4 by determining when a task starter 220 has commenced execution of a task 4 on a resource 6, and, when the task starter 220 has returned the exit status 41 of the task 4 to the PAM 240. This will assist the PAM 240 in managing the resources 6 by dispatching tasks 4 to resources 6 which are available and not executing other tasks 4.

Accordingly, by having the exit status 41 of task 4, and preferably a signal including the process identifier and host pid/host 26, from the task starter 220 upon commencement of execution of a task 4 on a resource 6, returned to the PAM 240, the PAM 240 can more efficiently manage the resources 6 of the system 200. The PAM 240 can also execute proxy processes or other types of algorithms or daemons, to properly manage and control the resources 6 and acquire resource usage information while the task 4 is being executed. Accordingly, the managing and controlling functions of the PAM 240 will be improved because of the additional information the PAM 240 has regarding the execution of the task 4. In addition, the PAM 240 will perform its customary functions of providing a point for job control such as stopping, resuming, or suspending a job.

FIG. 4 illustrates the operation of the system 200. The general steps for executing the task 4 of a parallel job 90 are illustrated by FIG. 4, steps 1s to 7s.

In the first step 1s, a parallel job 90 is sent to the PAM 240 invoking the PAM 240. The PAM 240 will separate the parallel job 90 into its multiple task 4. The PAM 240 will then select a resource 6 and host 40 for executing the task 4 based on the information which the PAM 240 has regarding the resources 6 contained in all the hosts 40, as outlined above. In particular, the PAM 240 may contain daemons which have information regarding what type of tasks 4 that were previously executed by resources 6, how resource 6 executed the previous task, and which resources 6 are presently executing other tasks 4. With this information, the PAM 240 should select the host 40 containing the resources 6 which will efficiently execute the task 4. In an alternate embodiment, the user may have specified the host 40 or resources 6 which should be used to execute a particular job 90 or task 4.

In the preferred embodiment, at step 1s the coordinating unit 250 of the PAM 240 will also set up the actions to be taken by the external event unit 260 upon occurrence of later external events, such as receipt of the pid/host information 26 and the receipt of the exit status 41 and/or resource usage from the task starters 220. In general, the task commencement action or event handler will instruct the external event unit 260 to store the pid/host information in the PAM 240 unit 260 and likely the group table 360 for use by the PAM 240 either to collect and store further information such as the exit status 41 and resource usage, and/or control the task 4. The task exit action or event handler will generally instruct the external event unit 260 to store the exit status 41 and/or resource usage information for a particular task 4 upon receipt of this information from the task starter 220. The coordinating unit 250 at this time will also modify or generate the command instructions 28 to indicate to the task starter 220 where to send the pid/host information 26 and exit status 41 of the completed task.

The PAM 240 then dispatches the task 4 to the parallel job launcher unit 180 and starts the parallel job launcher unit 180 in step 2s. The job launcher unit 180 will then send the task starters 220 to the appropriate host 40 identified by the command instructions 28, such as "host A given in the above example. The job launcher 180 will then start the task starter 220 on the selected host 40. The task starters 220 are generally invoked from the command instructions 28.

At step 4s, the task starters 220 start the task 4 on the associated resources 6. Preferably, at step 5s, the task starters 220 send a signal back to the PAM 240 indicating that execution of the task 4 has been commenced on the resource 6. This signal will preferably include the process identifier pid of the task 4. The task 4 will more preferably send the process identifier and host pid/host information 26 to identify the host 40 on which the task 4 was commenced to assist the PAM 240 in correlating the process identifier pid with the information stored in the PAM 240 corresponding to the tasks 4, such as the command instructions 28. In other words, the task starter 220 will send back to the PAM 24 information consisting of a part or all of the command instruction 28, in particular the pid/host information 26. This assists the PAM 240 in managing and controlling the task 4 and resources 6, as discussed above, at step 6s.

When the resource 6 completes execution of the task 4, the task starter 220 collects the exit status 41 of the task 4. The task starter 220 then reports the exit status 41 of the task 4 back to the PAM 240, shown as steps 7s. With the process identifier and host pid/host information 26 of the task 4, the PAM 240 has sufficient information to collect and map the exit status 41 of the task 4 in the task table 360 as shown at steps 7s. The task starters 220 terminate with the same exit status 41 as the task 4 to make the task starters 220 transparent to the job launcher unit 180.

At step 6s, and while the resource 6 is still executing the task 4, the PAM 240 will have the process identifier and host identifier pid/host information 26 which permits the PAM 240 to control the tasks 4, such as by stopping, resuming or killing the tasks 4 being executed on the resource 6, or accomplish other functions through other daemons working for the PAM 240. Also, with the pid/host information 26, the PAM 240 can more easily collect and correlate the exit status 41 of the task 4 at step 7s to assemble the completed job 290.

In a preferred embodiment, in addition to returning the exit status 41 of the task 4, the task starters 220 may at step 7s also collect and return the resource usage by the task 4. The exit status 41 and resource usage of the task 4 may be received by the external event unit 260. A predetermined action, either separate or part of the task exit action, may be performed on this information by the external event unit 260 as pre-programmed by the coordinating unit 250. These predetermined functions may include storing the resource usage information in the PAM 240, or, providing the resource usage information or a running sum to another location for accounting and billing purposes.

It is understood that the PAM 240 generally generates the command instructions 28. This can be done either by the PAM 240 generating the command instructions 28, or, the coordinating unit 250 generating the command instructions. This may also be accomplished by both the PAM 240 and coordinating unit 250 generating the command instructions 28, or, modifying the command instruction generated by the other unit. It is understood that reference in this application to the command instruction 28 being generated by either the PAM 240 or coordinating unit 250 is intended to include the command instruction 28 being generated and or modified by either the PAM 240, the coordinating unit 250, or the PAM 240 and coordinating 250 in addition with other elements.

It is also understood that reference to host identifier host in this application is intended to also include host and resource identifier. In the event that the host 40 has more than one resource 6, the host identifier host will identify the host 40 and a specific resource 6 on the host 40 which has been selected.

It is understood that the portion of the command instructions 28 returned to the PAM 240 may be any portion that has been stored in the PAM 240. For example, the portion could be the host identifier, as described above, whether the host identifier is copied from the command instruction 28 or regenerated by the operating system, resource 6 or task 4. The portion could also comprise other information contained in the command instruction 28 such as the task starter 220 or an identifier of the task starter 220, or another identifier, however generated.

It is understood that reference to task 4 is intended to include any type of task. In other words, the task 4 is not limited to a particular type of task, such as Message Passing Interface (MPI) task 4. Accordingly, the invention is not limited to MPI task, but rather can be used with any type of task.

It is understood that the term host 40 is used broadly in this application to include both hosts 40 as well as nodes, and other structures which may support, host or contain resources 6 to execute jobs 4, and/or the parallel job launcher 180. It is also understood that the resources 6 are considered to be separate in that they are located in separate hosts 40, nodes (not shown) or other structures that can support, host or contain the resources 6. It is understood that the tasks 4 may be executable in parallel by separate resources 6 to produce the exit status 41 of the task 4.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, electrical or mechanical equivalents of the specific embodiments and features that have been described and illustrated herein.

The embodiments of the invention in which an exclusive property or privilege is claimed are defined as follows:

1. In a system for executing parallel jobs, each parallel job comprising multiple tasks executable in parallel by separate resources said system comprising a resource manager for receiving the jobs and dispatching the parallel tasks of the job to the resources through a job launcher unit, a device to facilitate execution of the tasks of a parallel job comprising:
  a task starter associated with each task, each task starter commencing execution, on an associated resource, of the task collecting a process identifier of the task from the associated resource, and sending the process identifier of the task to the resource manager;
  an external event unit, associated with the resource manager, for receiving the process identifier of each task from the associated task starter;
  a coordinating unit, associated with the resource manager, for inserting said task starters in a command instruction associated with the task, each command instruction corresponding to a task and at least a portion of the command instruction being stored in the resource manager;
  wherein the task starters return the portion of the command instruction of the task with the process identifier, said command instructions comprising a host identifier for identifying a host containing the resource to execute the task, and, wherein the portion of the command instruction of the task includes the host identifier and, said coordinating unit of the resource manager starts the job launcher unit which executes the command instructions and starts the task starters on hosts identified by the host identifier; and
  wherein once a task has been completed on the associated resource, the task starter collects the exit status of the task from the associated resource and sends the exit status of the task to the resource manager together with the process identifier and host identifier.

2. The device as defined in claim 1 wherein the coordinating unit inserts in the command instruction location information for the task starters to send the process identifier and an exit status of the tasks to the resource manager.

3. The device as defined in claim 2 wherein the location information comprises port and host information of the resource manager.

4. The device as defined in claim 1 wherein the external event unit performs a commencement action upon receipt of the process identifier from a task starter, said commencement action including mapping the process identifier with the portion of the command instruction stored in the resource manager, and storing the process identifier in the resource manager.

5. The device as defined in claim 4 wherein once a task has been completed on the associated resource, the task starter collects the exit status of the task from the associated resource and sends the exit status of the task to the resource manager together with the process identifier; and
  wherein the external event unit performs a task exit action upon receipt of the task exit action having been predetermined by the coordinating unit.

6. The device as defined in claim 5 wherein the coordinating unit stores the commencement actions and completion actions in the resource manager prior to the task being dispatched, said actions being associated with said command instruction for the task.

7. The device as defined in claim 5 wherein, once a task has been completed on an associated resource, the task starter collects resource usage information of the task from the resource and sends the resource usage information to the resource manager together with the process identifier.

8. In a system for executing parallel jobs, each parallel job comprising multiple tasks, each task executable in parallel by separate resources to produce an exit status for the task, said system comprising a resource manager for receiving the jobs and dispatching the tasks to the resources, a method for facilitating execution of the multiple tasks of a parallel job comprising:

for each task, dispatching the task together with an associated task starter from the resource manager to a selected resource for execution of the task;

for each task starter, collecting a process identifier of the task being executed from the resources;

for each task starter, sending the process identifier to an external event unit associated with the resource manager;

generating, prior to dispatching the task, a command instruction corresponding to each task, said command instruction including the task starter, and storing at least a portion of the command instruction in the resource manager, sending the portion of the command instruction with the process identifier from each task starter to the external event unit, and correlating the command instructions stored in the resource manager with the process identifier and the portion of the command instruction;

wherein the command instructions include instructions for the task starters to send the exit status of the tasks to a location associated with the resource manager; and wherein each task starter sends the exit status of the task with the process identifier or the portion of the command instruction, or both, to the location identified by the command instructions upon completion of the execution of the task.

9. The method as defined in claim 8 wherein the command instructions include instructions for the task starters to send the process identifiers of the tasks to a location associated with the resource manager; and wherein the task starters send the process identifiers of the tasks to the location identified by the command instructions upon commencement of the execution of the task.

10. The method as defined in claim 8 further comprising:

prior to dispatching the task, storing an action to be performed upon receipt by the external event unit of the exit status of a task, said action being associated with the command instruction; and upon receipt of the exit status of the task, identifying the action associated with the command instruction of the exit status of the task, and executing the action on the exit status of the task.

11. The method as defined in claim 10 wherein the task starters collect from the resources information regarding resource usage of the task and the task starter sends the information regarding resource usage of the task with the process identifier to the resource manager.

12. The method as defined in claim 8 wherein the command instructions comprise a host identifier for identifying the host containing the resource to execute the task; and wherein said step of dispatching the task further comprises:

starting a job launcher unit, said job launcher unit executing the command instruction for the task and starting the task starters on resources hosted by the host identified by the command instruction.

13. A system for executing parallel jobs, each parallel job comprising multiple tasks, each task being executed in parallel by separate resources to produce an exit status for the task, said system comprising:

a resource manager for receiving the jobs and selecting resources to execute the multiple tasks of the job;

a task starter associated with each task, each task starter commencing, on an associated resource, the tasks sent from the resource manager, collecting a process identifier from the associated resource, and sending the process identifier of the task to the resource manager;

a job launcher unit for receiving the multiple tasks of a job from the resource manager and starting the task starters on hosts containing the resources selected by the resource manager;

a coordinating unit, associated with the resource manager, for inserting in a command instruction for each task the task starters associated with the task and each command instruction corresponding to a task and at least a portion of the command instruction being stored in the resource manager;

wherein the task starters return the portion of the command instruction of the task with the process identifier, and the command instructions comprise a host identifier for identifying a host containing the resource to execute the task, and, wherein the portion of the command instruction of the task includes the host identifier; and wherein once a task has been completed on the associated resource, the task starter collects the exit status of the task from the associated resource and sends the exit status of the task to the resource manager together with the process identifier and host identifier.

14. The system as defined in claim 13 further comprising:

an external event unit, associated with the resource manager for receiving the process identifier and exit status of the task from the task starter;

wherein the external event unit performs a commencement action upon receipt of the process identifier from a task starter, and, a task exit action upon receipt of an exit status of the task; and wherein the task commencement action and task exit action are predetermined by the coordinating unit.

15. The system as defined in claim 13 wherein the task starters send resource usage information to the resource managers at completion of the task.

* * * * *